INVENTOR.
JOHN W. COX
BY
ATTORNEY

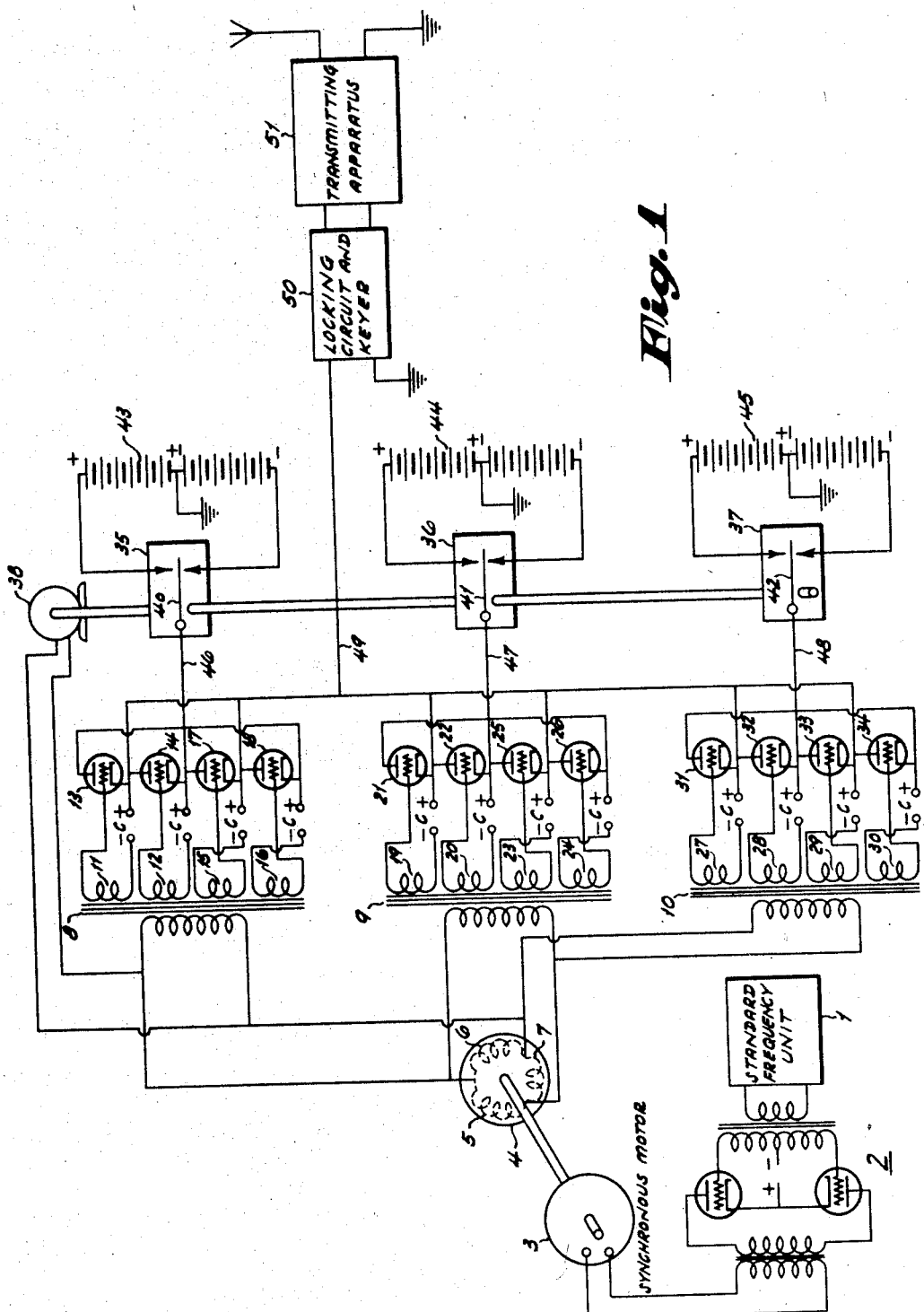

Patented Aug. 22, 1944

2,356,221

UNITED STATES PATENT OFFICE 2,356,221

ELECTRON SWITCHING FOR SPEED CONTROL CIRCUITS

John W. Cox, Berkeley, Calif., assignor to Radio Corporation of America, a corporation of Delaware Original application September 5, 1941, Serial No. 409,623. Divided and this application April 7, 1943, Serial No. 482,115

4 Claims. (Cl. 178—53)

This invention relates to electric switching produced by electron action and is a division of my application filed September 5, 1941, Serial No. 409,623.

An object of the invention is to supplant mechanical switching devices in speed and phase control circuits by inertialess circuit closers.

Another object is to produce an inertialess control of a speed correction unit in a multiplex telegraph system.

Other objects will appear in the following description, reference being had to the drawings, in which:

Figure 1 is a circuit diagram of the transmitting apparatus, certain old and well-known apparatus being shown in block diagram.

Figures 2, 4:
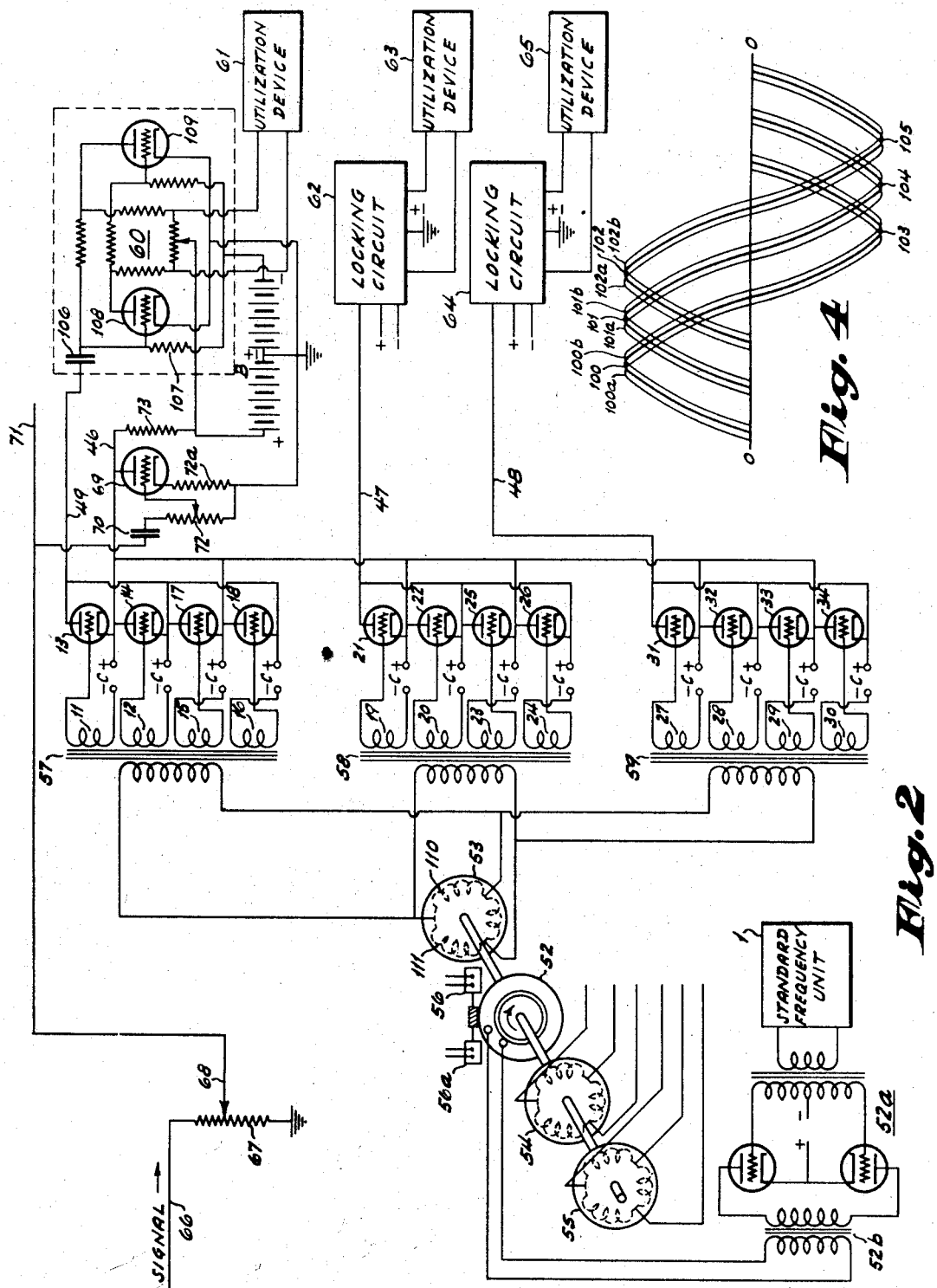
Figure 2 is a circuit diagram of the receiving apparatus.

Figure 4 gives a series of graphs illustrating the principle of operation of the invention.

In multiplex telegraph systems it is usual to assign a channel, such as a wire or radio link, to a plurality of transmitting or receiving devices in continuous succession by means of a commutator and switch arrangement moving relatively to each other. The commutator device at the receiver is maintained in synchronism with the commutator distributor at the transmitter. This is usually done by having standard frequency units that maintain the same frequency to within one part in a hundred thousand or better, to produce exact proportional speed and synchronism over a period of time. For absolute accuracy, the speed of the motor driving the receiving distributor is changed by speed control unit the required amount. While these mechanical distributors have proven quite satisfactory, they nevertheless are subject to wear and require expensive maintenance. It is therefore an advantage to use an inertialess distributor such as can be produced by electron action in my improvement.

Referring to Fig. 1 of the drawings, I indicates the standard frequency unit, which may be of any type, and 2 a push-pull amplifier. Additional stages may be used and this is indicative only for producing power under control of the standard frequency unit at a constant frequency of alternating electromotive force. Power from the amplifier 2 is applied to a synchronous motor 3 which runs a three-phase generator 4, shown with coils 5, 6 and 7 arranged in delta, but of course they could be used in a Y or star connection if desired. These coils produce electromotive forces that are 60° apart. Coil 6 is connected to the primary of transformer 8, coil 5 to the primary of transformer 9, and coil 7 to the primary of transformer 10. Secondaries 11 and 12 of transformer 8 are connected to the input circuits of triodes 13, 14 through a suitable negative bias that normally blocks the tubes. Secondaries 15 and 16 of transformer 8 are connected to similarly blocked triodes 17 and 18 in a reverse direction as compared to the connection of coils 11 and 12. Secondaries 19 and 20 of transformer 9 are connected to triodes 21, 22 through a blocking C battery or other negative bias, and secondaries 23 and 24 of this transformer are reversely connected to the input of triodes 25, 26 through a blocking bias. Secondaries 27, 28, 29 and 30 of transformer 10 are connected to the input of blocked vacuum tubes 31, 32, 33 and 34 in exactly the same way as the secondaries of transformers 8 and 9 are connected to their respective tubes.

The plates of triodes 13 and 17 are connected together and to the cathodes of triodes 14 and 18. These electrodes are then connected to tongue 40 by line 46. The plates of triodes 21 and 25 are similarly connected together and to the cathodes of triodes 22 and 26. They are also connected by line 47 with tongue 41. The plates of triodes 31 and 33 are likewise connected together and to the cathodes of triodes 32 and 34. These electrodes are then joined by line 48 with tongue 42.

Reference characters 35, 36 and 37 indicate any type of automatic transmitter such as a tape transmitter, well known in the art. These transmitters have circuit closers maintained at the same speed and phase, as well known in the art. This is indicated for convenience of illustration by a synchronous driving motor 38 operated from the generator 4, although any type of motor control may be used, such as disclosed in the patent to Callahan et al., 2,010,505, August 6, 1935, for example. The switching mechanism manipulated by the driving motor 38 is diagrammatically illustrated as tongues 40, 41 and 42 operated in unison to alternately engage plus and minus contacts connected to suitable batteries 43, 44 and 45. These batteries have the center grounded, as usual. It will be understood that the switch tongues that alternate towards the plus and minus contacts in each tape transmitter make electrical contacts under control of perforations in the tape. This has not been illustrated, as it is a well-known action and there is no need to complicate the drawings by showing this portion of the prior art.

The cathodes of tubes 13, 17, 21, 25, 31 and 33 are connected to conductor 49, which connects to a Finch locking circuit and the keyer indicated by block diagram 50. This locking circuit and keyer is a well-known construction and a description may be found in Finch Patent 1,844,950, February 16, 1932, and its specific application to a multiplex telegraph system is fully described in Mathes Patent 2,214,642, September 10, 1940, page 4, commencing at line 59. This manner of controlling a radio transmitter or wire line, per se, is not my invention and hence it need not be described. The output of the locking circuit 50 is connected to the input of the transmitting apparatus 51, though in a wire line system it would be connected to the outgoing line or cable.

In the receiving apparatus of Fig. 2, the synchronous motor 52 is connected to a push-pull amplifier stage 52a through transformer 52b and standard frequency unit 1, such as is shown in Fig. 1. This motor operates three 3-phase generators 53, 54 and 55, which are not in exact phase. Generator 54 leads generator 53 slightly, while generator 55 lags generator 53 by an equal angle.

The stator of synchronous motor 52 is rotatable for speed control purposes. This stator is rotated a slight amount by two correction A. C. motors 56, 56a, the gearing being such that the adjustment made by the correction motor holds. This can be accomplished, for example, by making it of the worm and gear type. A. C. motor 56, when energized, rotates the stator, say, clockwise when the motor 52 lags slightly the motor 3 at the transmitter, while motor 56a rotates the stator counter-clockwise when the receiving motor leads. This brings the receiving motor into correct phase and speed.

The three-phase generator 53 has one phase connected to transformer 57, another to transformer 58, and the remaining phase to transformer 59. These three transformers each have secondaries connected to vacuum tubes exactly in the same way as described in connection with Fig. 1 and they and their connection secondaries have been given the same reference characters as in Fig. 1. In view of this, the connections will be understood without repeating them in detail. The conductor 49 in Fig. 2 connects the plate of tube 13 to a Finch locking circuit 60, which, as stated, is a well-known switching device. The output of this locking circuit is connected to any utilization device 61, for example, a siphon recorder. The conductor connected to the plate of tube 21 is joined to the line 47 and this line is connected to the locking circuit 62, which may be the same as locking circuit 60. Hence, the circuit has not been shown in detail. The output of locking circuit 62 is connected to utilization device 63. The conductor connected to the plate of tube 31 is connected to line 48 and this line is connected to locking circuit 64, similar to the locking circuit 60, and the output of this locking circuit is connected to utilization device 65.

The receiving station employing the usual amplifiers, detectors and other devices, is not shown in the drawing, as it may be of any desired form. It is assumed that the signal current after detection, or after conversion to tone frequency and rectification, comes in over line 66 and produces a signal potential in potentiometer 67. This potentiometer has an adjustable tape 68 connected to the grid of vacuum tube 69 through a condenser 70 and thence to ground through resistance 72. The signal potential is also conveyed through line 71 to the speed control circuits, not shown in Fig. 2 but illustrated in Fig. 3. The vacuum tube 69 has its cathode connected to ground through a suitable bias resistance 72a. Ground is the usual "plus or minus" terminal of the battery, as shown. The plate of this tube is connected through resistance 73 to the positive terminal of the battery and also to the conductor 46 connected to the plates of tubes 14, 18, 22, 26, 32 and 34, as well as to the other parts, as previously described in connection with Fig. 1. Tube 69 is biased so that the plate current is small and normally produces only a small drop in resistance 73. Tubes 21, 22, 25 and 26 have their plates and cathodes similarly connected to locking circuit 62 by conductor 47 and tubes 31, 32, 33 and 34 are connected in a similar way to locking circuit 64 by conductor 48.

Figure 3:
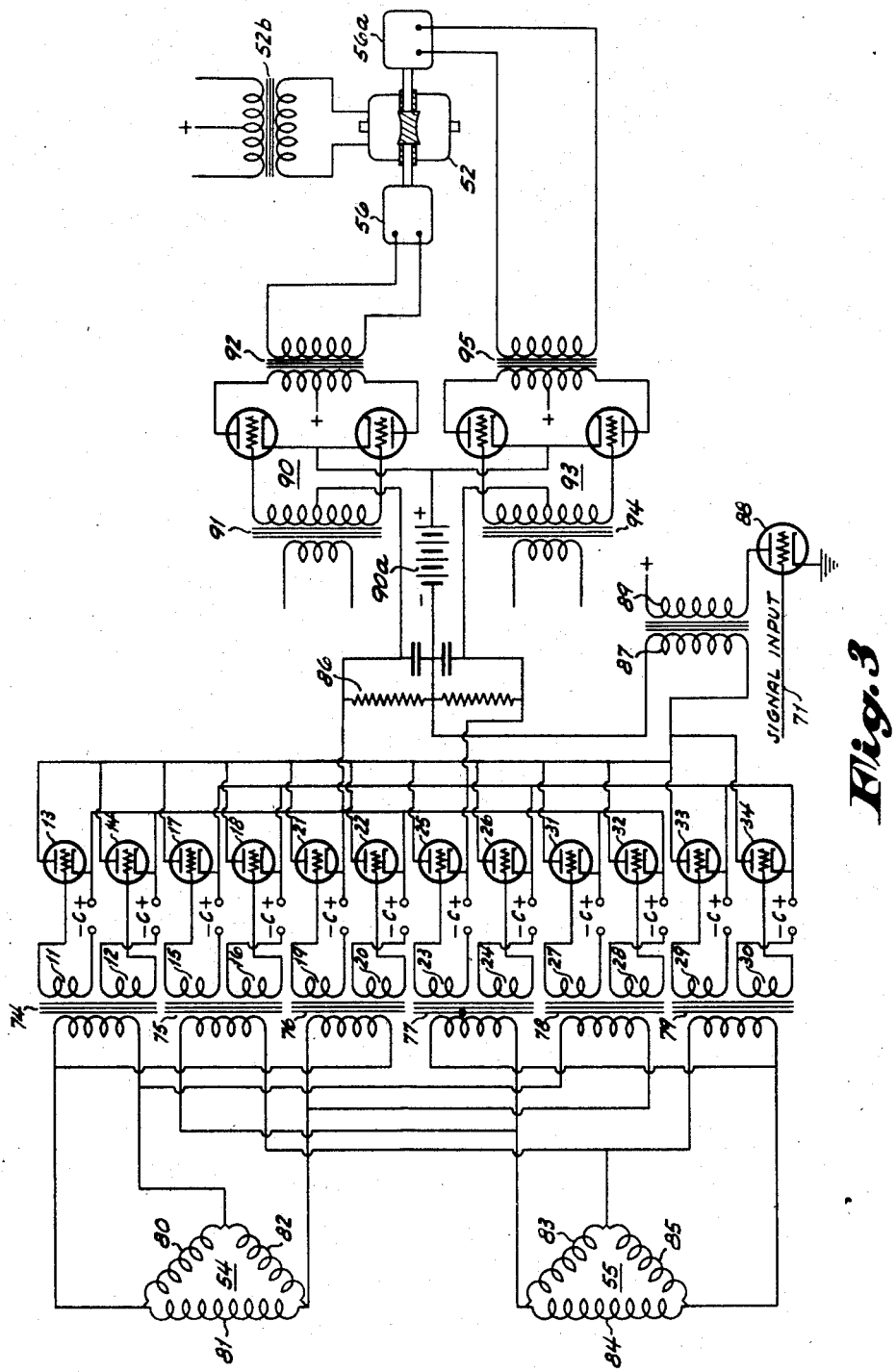
Figure 3 is a circuit diagram of the speed correction system of the driving motor in Figure 2.

In Fig. 3 the three-phase generators 54, 55 are indicated by their armature coils. In this figure there are six separate transformers, instead of three as in Figs. 1 and 2. Leading generator 54 has its armature coils 80, 81 and 82 connected respectively to the primaries of transformers 74, 76 and 78. Lagging generator 55 has its armature coils 83, 84 and 85 connected respectively to the primaries of transformers 75, 77 and 79. The twelve secondaries of the six transformers are connected to the input circuits of the tubes, half being reversed, as shown in Fig. 2. These secondaries and tubes have been given the same reference characters as in Figs. 1 and 2 and the grid voltages in all of the tubes normally block the tubes as in the other figures. The plates of all tubes are connected together and to the lower end of secondary coil 87. The other end of coil 87 is connected to an intermediate point of resistance 86. The cathodes of tubes 13, 14, 21, 22, 31 and 32 are connected together and to the upper end of resistance 86. The cathodes of tubes 17, 18, 25, 26, 33 and 34 are connected together and to the lower end of resistance 86.

The signal input 71 (see Fig. 2 also) is connected to the grid of tube 88, having its cathode grounded. The output circuit of the tube includes the primary coil 89 of the transformer having the secondary 87.

Push-pull stage 90 has an alternating current of, say, 60 cycles fed to the input circuit through transformer 91. An intermediate point of the secondary of this transformer is connected to the upper end of resistance 86 and the joined cathodes of this stage are connected to the intermediate point of this resistance through blocking negative bias source 90a. The output of this stage is fed through transformer 92 to alternating current motor 56. Push-pull stage 93 similarly has 60 cycle alternating current fed to its input circuit through transformer 94. An intermediate point of the secondary of this transformer is connected to the lower end of resistance 86 and the joined cathodes are connected to the intermediate point. The secondary of the output transformer of push-pull stage 93 is connected to alternating current motor 56a.

The operation will now be described:

Referring to Fig. 1, synchronous motor 3 will run at a substantially constant speed by operation of the standard frequency unit and push-pull stage 2. This will produce a three-phase voltage in generator 4, as indicated in Fig. 4. This generator may be designed, if desired, to produce more sharply peaked voltages than usual in well-known ways, one being described in the patent to Finch, 1,844,950, though this peaked form of wave is not essential. Let it be assumed that channel No. 1 is connected to tape transmitter 35, channel No. 2 to tape transmitter 36, and channel No. 3 to tape transmitter 37 and that the outgoing line 49 is to be assigned to these channels in regular succession at equally-spaced time intervals by my improved inertialess distributor.

Current will pass from channel No. 1 for the brief instant at the peak 100 of the voltage produced by phase No. 1 (coil 6) of generator 4 in the primary of transformer 8. As previously explained, all of the twelve tubes have sufficient negative bias to carry them below the blocking point. If we assume that the time of the voltage peak 100 has just arrived in the secondary of transformer 8, tube 13 will be unblocked by the voltage and current will pass from the positive terminal of battery 43, assuming that tongue 40 engages the positive terminal due to the perforation of the tape, to the plate of tube 13, to its filament and thence to conductor 49 to the usual locking circuit and keyer, which will send out a signal through the transmitting apparatus in a well-known way. This is a well-known operation and need not be described. The action, however, is described in the above-mentioned Mathes Patent 2,214,642. It will be noted that tongue 40 is also connected to the plate of tube 17, but at this time current cannot pass through tube 17 because the coil 15 is reversely connected to the input circuit and the peak of the voltage wave 100 merely gives the blocked tube a still greater negative voltage. If tongue 46 had been in contact with the negative terminal for a space signal, current would have flowed from the terminal of the battery 43 through keyer 50 and tube 14, tube 18 being blocked in this half cycle.

When the peak 101 of phase No. 2 (coil 5) of generator 4 arrives in transformer 9, assuming that tongue 41 engages the positive terminal in the tape transmitter, current will pass from the positive terminal of battery 44 through the tongue and through the plate-cathode circuit of tube 21 to line 49 and thence to the locking and keying circuit, as previously referred to for channel No. 1. Current at this time cannot pass through tube 25 because of the reversed input connections.

When the peak 102 of the third phase (coil 7) of generator 4 arrives in transformer 10, assuming that tongue 42 has engaged the negative terminal in the tape transmitter, because of the absence of a perforation, current will pass from the "plus or minus" terminal to ground through locking circuit 50, conductor 49, through the plate-cathode circuit of tube 32 to tongue 42 and the negative terminal. Current cannot pass through tube 34 at this time, because the reversed coil connection merely increases the blocking potential of the tube.

At the next instant, negative peak 103 of the first phase of generator 4 arrives in transformer 8. This more strongly blocks tubes 13 and 14 and unblocks tubes 17 and 18. Current can flow to the locking circuit through tube 17 and not through tube 13, if tongue 40 is in engagement with the positive terminal in the tape transmitter through a perforation. If the signal mark terminated and the negative terminal were engaged by the tongue, current would have to pass from the "plus or minus" terminal through tube 18, as previously described for the positive half cycle in connection with tube 14. In like manner, peaks 104 and 105 of the second and third phases of generator 4 will connect, or switch, by electron means, channels No. 2 and No. 3 to the outgoing line for a mark or a space signal, as the case may be.

At the receiving station the standard frequency unit 1 will maintain the speed fairly constant over a considerable period of time, but to maintain it exactly constant the correction unit is used. Inasmuch as correction takes place after only a small departure from synchronism, the correction unit is in reality a phase corrector. This speed, or phase corrector is shown in Fig. 3, but before explaining its operation, correct phase condition will be assumed in explaining the switching arrangement of Fig. 2.

It will be assumed that tube 108 is conducting and tube 109 blocked. Condenser 106 is assumed to be fully charged, due to the low drop in resistance 73 of the plate circuit of tube 69. Assuming that a D. C. mark from channel No. 1 has arrived, a direct current drop is produced in resistance 67 and this drop charges condenser 70. During the charging of the condenser a voltage drop is produced in resistance 72, making the grid of tube 69 positive. This increases the transconductance of the tube and a sudden drop is produced in resistance 73. This lowers the voltage opposed to the charge in condenser 106 and it suddenly discharges through conductor 49, vacuum tube 13, the plate-cathode circuit of tube 69 to ground and through the right-hand half of the B battery and the grid resistance 107 of the locking circuit 60. This results because at this time tubes 13 and 14 are unblocked by the peak 100 (Fig. 4) produced by coil 110. The sudden lowering of the grid potential by the drop in resistance 107 blocks tube 108 and this automatically causes tube 109 to conduct, due to the connection of the grid of tube 109 to the plate of tube 108. This reverses the potential applied to utilization device 61 and a mark signal is sent thereto.

Since a mark signal was also assumed for channel No. 2, due to the drop in resistance 67 the locking circuit will now be unbalanced and a mark signal will be produced in device 63. When peak 102 arrives, the assumed space signal of channel No. 2 arrives and the drop in resistance 67 is reduced to zero or is reversed and condenser 70 discharges. A negative potential from the drop in resistance 72 is applied to the grid of tube 69, reducing the current to a minimum. This lowers the drop in plate resistance 73 and again applies practically full potential to condenser 106 through tube 14. Condenser 106 now charges and produces a drop in resistance 107 that applies a positive potential to the grid of tube 108. Tube 108 instantly conducts and simultaneously blocks tube 109, due to the lowering of the potential on its grid. This reverses the output potential and a space signal is sent to utilization device 65.

Negative peaks 103, 104 and 105 act in the same way, except tubes 17, 18, 25, 26, 33 and 34 are unblocked for passage of current and the other tubes are maintained in blocked condition.

Thus it will be seen that the generator 53 commutes or switches the signals to the utilization devices in unison with the commutation at the transmitter.

Let it now be assumed that the standard frequency unit at the receiver lags slightly the unit at the transmitter. When a composite mark or space begins, a sudden change of potential will appear at the grid of tube 88. The connections could be arranged for either, but let it be assumed that the circuit is such as to utilize the voltage change produced at the beginning of the mark and that the change of potential on the grid of tube 88 causes a positive potential kick to appear at the lower end of secondary coil 87. Since there is a lag in phase between the local frequency and the signal, this kick will appear at the peak 100b, 101b or 102b of generator 54. Assume that it is 100b. The short kick will cause a pulse to flow through tube 13 to the upper end of resistance 86 and thence to the other terminal of coil 87 through the mid-tap connection of the resistance. The drop in the upper half of resistance 86 will thus be applied to the input electrodes of the tubes of push-pull stage 90. The positive potential on the grids will overcome the blocking bias of bias source 90a and 60 cycle alternating voltage from transformer 91 will produce an alternating voltage in the output transformer 92 and operate motor 56. This will rotate the stator of motor 52 clockwise (see also Fig. 2) and kick the rotor forward to reduce the lagging of the rotor behind the incoming signals.

If the departure from correct phase is sufficient, additional kicks from the succeeding mark signals will pass through the tubes to alter the speed until correct phase is produced.

If the standard frequency unit at the receiver leads the one at the transmitter, the potential kick in secondary 87 will arrive when peak 100a, 101a or 102a is produced in generator 55. Assume it is 100a. In this case, the potential kick from coil 87 will cause a current pulse to pass through tube 17 to the lower end of resistance 86 to the mid-point and back to the other end of secondary 87. This will place a sufficient positive, or reduced negative, potential on the grids of push-pull stage 93 to produce 60 cycle voltage in the circuit of motor 56a. This motor will rotate the stator of motor 52 counter-clockwise and kick the rotor of that motor backwards to slow down generator 53. This continues at the beginning and end of each composite mark until exact synchronism of phase is obtained, but the potential kick will send current to the resistance 86 through the tube corresponding to the channel transmitting the particular signal.

In the drawings I have omitted the heaters for the unipotential cathodes of the vacuum tube, but it will be understood that these will be used and energized in the usual way. It will be apparent that other types of tubes may be used with any desired number of electrodes, as the invention is not dependent upon the action of any particular type.

The invention is not to be limited to the particular embodiments disclosed, as these have been given by way of example.

Having described my invention, what I claim is:

1. In receivers for multiplex telegraph circuits having a substantially constant frequency source subject to slight variations from synchronism with the received signals, a distributor member, means for driving said distributor member at a speed normally proportional to the frequency of said source, a first and a second polyphase generator, each having a frequency proportional to the speed of said distributor member, one leading and the other lagging the distributor member, a plurality of tubes, each phase of each generator being connected to the input circuits of a separate pair of said tubes, one tube of each pair being reversely connected in respect to the other tube thereof, one tube of each pair being blocked below the positive peak and the other below the negative peak of the applied alternating current, electromagnetic means for increasing and decreasing the speed of said distributor member, means for applying potential to the output circuits of said plurality of tubes at a constant phase point of the signals, whereby the tubes pass current only upon said constant phase point coinciding with the peak of the voltage of correct sign in the input of their respective circuits and means for passing current to said electromagnetic means to increase the speed upon passage of current by the tubes connected to the leading generator and for decreasing the speed upon passage of current by the tubes connected to the lagging generator.

2. In receivers for multiplex telegraph circuits having a substantially constant frequency source subject to slight variations from synchronism with the received signals, a motor having a speed substantially proportional to the frequency of said source, a distributor member driven by said motor, a first and a second polyphase generator, each having a frequency proportional to the speed of said distributor member, one leading and the other lagging the distributor member, a plurality of tubes, each phase of each generator being connected to the input circuits of a separate pair of said tubes, one tube of each pair being reversely connected in respect to the other tube thereof, a negative bias source in the input circuit of each tube of the pairs blocking one below the positive peak and the other below the negative peak of the applied alternating current, electromagnetic means for increasing and decreasing the speed of said motor, an amplifying tube having the input circuit supplied with the received telegraph signals and adapted to apply potential to the output circuits of said plurality of tubes at a constant phase point of the signals, whereby the tubes pass current only upon said constant phase point coinciding with the peak of the voltage of correct sign in the input of their respective circuits and means for passing current to said electromagnetic means to increase the speed upon passage of current by the tubes connected to the leading generator and for decreasing the speed upon passage of current by the tubes connected to the lagging generator.

3. In receivers for multiplex telegraph circuits having a substantially constant frequency source subject to slight variations from synchronism with the received signals, a synchronous motor driven from said source, a distributor member driven by said motor, a first and a second polyphase generator driven by said motor, one leading and the other lagging the distributor member by a constant phase angle, a separate pair of tubes having their input circuits connected to each phase of said generators, one tube of each pair being reversely connected in respect to the other tube thereof, a negative bias source in the input circuit of each tube of the pair blocking one below the positive peak and the other below the negative peak of the applied alternating current, electromagnetic means for rotating the stator of said motor forwardly and backwardly, means for applying potential to the output circuits of said plurality of tubes at a constant phase point of the signals, whereby the tubes pass current only upon said constant phase point coinciding with the peak of the voltage of correct sign in the input of their respective circuits and means for passing current to said electromagnetic means to rotate the stator forwardly upon passage of current by the tubes connected to the leading generator and backwardly upon passage of current by the tubes connected to the lagging generator.

4. In receivers for multiplex telegraph circuits having a substantially constant frequency source subject to slight variations from synchronism with the received signals, a synchronous motor driven from said source, a distributor member driven by said motor, a first and a second polyphase generator driven by said motor, one leading and the other lagging the distributor member by a constant phase angle, a separate pair of tubes having their input circuits connected to each phase of said generators, one tube of each pair being reversely connected in respect to the other tube thereof, a negative bias source in the input circuit of each tube of the pairs blocking one below the positive peak and the other below the negative peak of the applied alternating current, electromagnetic means for rotating the stator of said motor forwardly and backwardly, an amplifying tube having the input circuit supplied with the received telegraph signals and adapted to apply potential to the output circuits of said plurality of tubes at a constant phase point of the signals, whereby the tubes pass current only upon said constant phase point coinciding with the peak of the voltage of correct sign in the input of their respective circuits and means for passing current to said electromagnetic means to rotate the stator forwardly upon passage of current by the tubes connected to the leading generator and backwardly upon passage of current by the tubes connected to the lagging generator.

JOHN W. COX.